Jan. 1, 1946.   E. W. DAVIS   2,392,030
RESISTANCE UNITS
Filed Aug. 15, 1942
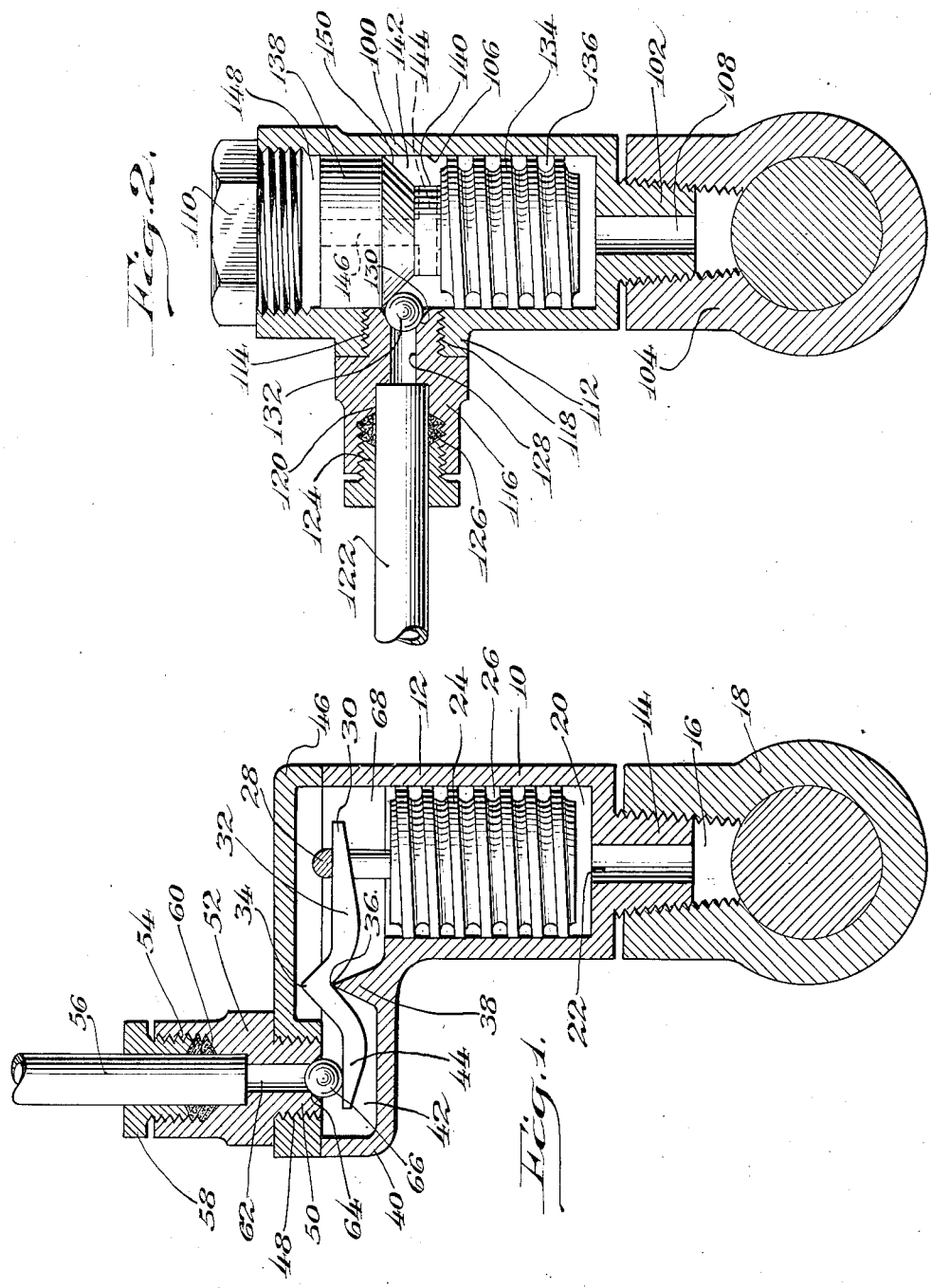
Inventor:
Ernest W. Davis
By Williams, Bradbury & Hinkle
Attorneys.

Patented Jan. 1, 1946

2,392,030

UNITED STATES PATENT OFFICE 2,392,030

RESISTANCE UNIT

Ernest W. Davis, River Forest, Ill., assignor to Stewart-Warner Corporation, Chicago, Ill., a corporation of Virginia Application August 15, 1942, Serial No. 454,923

8 Claims. (Cl. 137—152)

My invention relates to resistance units and more particularly to resistance units of the kinds used in centralized lubricating systems.

In centralized lubricating systems, lubricant from a central source such as a lubricant compressor is forced under pressure through a branch piping system to a plurality of bearings requiring lubrication. Metering means in the form of measuring valves or resistance units are commonly provided in the various branches of the piping system in order properly to distribute and apportion the lubricant among the several bearings.

The bearings supplied with lubricant by means of such a centralized lubricating system commonly offer different resistances to the inflow of lubricant and numerous attempts have been made to provide inexpensive and reliable centralized lubricating systems which will properly apportion the lubricant among the several bearings regardless of their differences in resistance to the inflow of lubricant.

An object of my invention is to provide a resistance unit which shall automatically compensate for differences in resistance offered by the bearing to which it is attached and which will properly apportion the lubricant among the several bearings of a centralized lubricating system.

Another object of my invention is to provide a new and improved resistance unit which can be used in a centralized lubricating system supplied with grease or other semi-solid lubricant and which will adjust itself automatically so that the resistance unit and the bearing together will offer a predetermined resistance.

Another object of my invention is to provide a new and improved resistance unit which can be made in large quantities by ordinary mass production methods and which will accurately apportion a lubricant among the several bearings of a centralized lubricating system in accordance with their needs.

Another object of my invention is to provide resistance units which automatically adjust themselves to compensate for variations in resistance of the several bearings of a centralized lubricating system and which can be installed by men who have no special training in the design, construction, or operation of centralized lubricating systems.

Another object of my invention is to provide a resistance unit which is suitable for use with bearings having a wide difference in resistance to inflow of lubricant.

Another object of my invention is to provide a resistance unit having a minimum of parts and so constructed that it is not easily affected by dirt or other impurities contained in the lubricant.

Other objects and advantages will become apparent as the description proceeds.

In the drawing:

Fig. 1 is a sectional view of a preferred embodiment of my invention; and

Fig. 2 is a sectional view of a second preferred embodiment of my invention.

In Fig. 1, I have shown a measuring valve 10 comprising a body 12 of metal or other suitable material and providing a nipple 14 threaded for engagement with the threaded hole 16 in the bearing member 18. The hole 16 and nipple 14 are preferably tapered in accordance with conventional practice so that the nipple 14 forms a lubricant-type seal with the bearing 18 when firmly screwed thereinto.

The body 12 provides a bore 20 in communication with a passage 22 through the nipple 14. The bore 20 is provided with a smooth cylindrical internal wall forming a suitable surface for coacting with a plug 24 having a helical groove 26 which forms a long passage of relatively large cross-section and relatively high resistance to the flow of grease or similar lubricant therethrough.

The resistance plug 24 is a snug fit in the bore 20, but is readily slidable therein. The upper end of the plug 24 is provided with a U-shaped strap 28 which is adapted to receive the arm 30 of a lever 32. This lever is bent as indicated at 34 to provide a recess 36 which rests upon the apex of a fulcrum 38 illustrated as constituting an integral part of the body 12. The apex of the fulcrum 38 constitutes a knife edge which supports the lever 32 but offers a minimum of resistance to pivotal movement of this lever about this apex.

The upper end of the body 12 has a lateral extension 40 which includes the fulcrum 38 and a space 42 for the arm 44 of the lever 32. A cap 46 is attached to the upper end of the body 12 by screws, bolts, or any other suitable attaching means, and has a threaded opening 48 adapted to receive the reduced end 50 of a pipe fitting 52. The fitting 52 has a recess 54 for receiving one end of a pipe 56 which constitutes one branch of a centralized lubricating system. Tubular nut 58 and compression ring 60 cooperate with the fitting 52 to provide a compression coupling which seals and locks the pipe 56 to the fitting 52.

The fitting 52 has a bore 62 in communication with the pipe 56 and this bore terminates at its lower end in a recess 64 which constitutes a valve seat for a ball valve 66. In the position of the parts shown in Fig. 1, lever 32 is holding ball 66 in contact with seat 64 and the resistance plug 24 is suspended from the one end of the lever 32.

In the operation of that embodiment of my invention shown in Fig. 1, the lubricant under pressure is supplied through pipe 56 and flows downwardly in bore 62. This lubricant displaces the ball valve 66 by pushing it downwardly away from seat 64 thereby providing an opening through which the lubricant can flow into the space 42. As the ball valve 66 is moved downwardly, lever arm 32 therebeneath is also moved downwardly and lever 32 is pivoted in a counterclockwise direction about the fulcrum 38. This pivotal movement of the lever 32 raises the resistance plug 24 upwardly in the bore 20.

The lubricant flowing past the ball valve 66 fills space 42 and space 68 located between the plug 24 and the cap 46. The lubricant then passes downwardly in the helical passage 26 into that part of the bore 20 beneath the resistance plug 24. From here the lubricant flows through bore 22 in nipple 14 to the bearing surface. If the bearing offers relatively little resistance to the inflow of lubricant, the lubricant flows rapidly through the helical passage 26 which offers a high resistance to this rapid flow of lubricant. This high resistance builds up lubricant pressure in the chamber 68 above the plug 24 and this lubricant pressure acts upon the upper end of this plug and moves it downwardly in the bore 20. This downward movement of the plug 24 pulls the righthand arm 30 of lever 32 downwardly and causes this lever to pivot in a clockwise direction about its fulcrum 38. Lever arm 44 is moved upwardly by this clockwise movement of the lever 32 and ball valve 66 is moved toward its seat 64.

As ball valve 66 approaches its seat 64, inflow of lubricant to chamber 42 is restricted and the lubricant pressure in this chamber and in chamber 68 decreases. This reduces the pressure available to force lubricant through helical passage 26 and thus reduces the lubricant flow through this passage and to the bearing. The lever 32, resistance plug 24, and ball valve 66 finally come to rest in such positions that the ball valve 66 offers appreciable resistance to flow of lubricant into chamber 42 and only part of the lubricant pressure in the pipe 56 is available to force lubricant through helical passage 26 and to the bearing surfaces.

If the bearing, on the other hand, offers a high resistance to inflow of lubricant, the lubricant flows relatively slowly through the passage 26 and the pressure drop across this helical passage is less. The downward pull exerted by the plug 24 on the righthand arm 32 of lever 30 is therefore less, and this lever urges ball valve 66 toward its seat 64 with less force. The ball valve 66 therefore offers less resistance to flow of lubricant from pipe 56 into chambers 42 and 68 and a larger proportion of the lubricant pressure in the pipe 56 is available in chamber 68 to force lubricant through the helical passage 26 and into the bearing. This greater lubricant pressure in chamber 68 functions to supply the proper amount of lubricant to the bearing surfaces in spite of the greater resistance offered by the bearing to inflow of lubricant to these surfaces.

From the foregoing description of the operation of this embodiment of my invention, it will be apparent that my novel resistance unit automatically adjusts itself to accommodate this bearing resistance. Such adjustment normally takes place when the lubricant is first supplied to the bearing, but further adjustments can take place throughout the life of the lubricating system to accommodate variations in bearing resistances which may occur from time to time.

It will be understood by those skilled in the art that each branch pipe of the centralized lubricating system is supplied with a resistance unit and that the operative parts of each resistance unit automatically adjust themselves to positions which correspond to the degree of resistance offered by their particular bearing. The operative parts of the several resistance units will ordinarily adjust themselves to different resistances since the bearings usually offer different degrees of resistance to inflow of lubricant. The net result will be that each bearing of the centralized lubricating system will receive its proper proportion of the entire quantity of lubricant supplied to the system and this desirable condition will obtain regardless of variations in the resistances of the individual bearings since these variations in resistances will be automatically compensated by the resistance units attached to these bearings.

The body 10 and resistance plug 24 may be made of any desired length. It is common in centralized lubricating systems to provide different branches with resistance plugs of different lengths so that the bearings supplied with lubricant by some branches will receive less lubricant than the bearings supplied through other branches. In this manner, the lubricating system is adapted to supply various bearings having widely different lubricating requirements.

My invention is readily adapted to utilize this common practice and the resistance plugs 24 of the different resistance units in a given centralized lubricating system may be of different lengths and therefore different resistances. The operation of my novel resistance unit is the same for all lengths of resistance plugs and in a centralized lubricating system utilizing my new and improved resistance units with different length resistance plugs, the variations in individual resistance of the different bearings will be automatically compensated and the bearings supplied with quantities of lubricant proportioned to their individual needs. These proportions will remain constant throughout the life of the lubricating system and such variations in resistance of individual bearings as may occur from time to time will be automatically compensated for.

My new and improved resistance unit is formed of a relatively few simple parts and these parts are so designed that they can readily be made by conventional machinery and by mass production methods since the tolerances required are well within the range normally encountered in mass production.

The resistance unit which I have illustrated and described is particularly adapted for use in centralized lubricating systems wherein grease or other semi-solid lubricant is supplied by the lubricant compressor. The resistance unit is not necessarily connected directly to the bearing part, although such an arrangement is usually preferable. In some instances, however, it may be found desirable to interpose a pipe or similar conduit between the bearing and the resistance unit.

In Fig. 2, I have illustrated a second form of my invention. In this form of my invention, the resistance unit has a tubular body 100 terminating at one end in a tapered nipple 102 adapted to be threadedly attached to a bearing 104. The body 100 has a smooth cylindrical bore 106 communicating at its lower end with a smaller bore 108 formed in nipple 102 and leading to the bearing surfaces. The upper end of the body 100 is closed by a screw cap 110 which may be readily removed for inspection or for any other desired purpose.

The body 100 is provided with a laterally projecting boss 112 and a threaded opening 114 extends through the boss 112 and adjacent part of the body 100. A fitting 116 has a threaded nipple 118 screwed into the opening 114. This fitting 116 has a recess 120 for receiving one end of a branch pipe 122 which is secured to the fitting 116 by tubular nut 124 and compression ring 126.

The fitting 116 has a bore 128 which forms a communication between the pipe 122 and the bore 106 of the body 100. The bore 128 terminates in a flaring portion 130 which constitutes a seat for ball valve 132.

A resistance plug 134 is located in that part of the bore 106 which is between inlet bore 118 and outlet bore 108. The plug 134 is slidable in the bore 106 and has a helical groove 136 constituting a resistance passage whereby the lubricant may pass to the bearing surfaces. The plug 134 is illustrated as being somewhat shorter than the plug 24 of the embodiment of Fig. 1, but it will be understood by those skilled in the art that these plugs can be made of different lengths to afford different degrees of resistance to the flow of lubricant therepast.

A head 138 is made integral with or rigidly attached to the resistance plug 134 and a reduced portion or neck 140 is located between the head 138 and plug 134. The annular space 142 between the neck 140 and body 100 is connected by bores 144 and 146 with the space 148 between the head 138 and screw cap 110. The head 138 is provided with a tapered surface 150 which coacts with ball valve 132 to move this valve toward its seat 130 when plug 134 and head 138 move downwardly.

When lubricant is supplied through pipe 122 to the resistance unit of Fig. 2, this lubricant moves ball valve 132 away from its seat and this movement of the ball valve pushes head 138 and resistance plug 134 upwardly as shown in Fig. 2. Lubricant then flows into annular space 142 and through helical passage 136 and bore 108 to the bearing surfaces. The resistance which passage 136 offers to the flow of lubricant therepast creates a differential pressure between opposite ends of this passage and this differential pressure urges plug 134 and head 138 downwardly and tends to seat ball valve 132.

When the bearing 104 offers little resistance to inflow of lubricant, there initially occurs a relatively large flow through the helical passage 136 thereby creating a relatively large differential pressure between opposite ends of this passage. This large differential pressure urges ball valve 132 towards its seat 130 and restricts flow of lubricant into annular space 142. This cuts down the fluid pressure in the space 142, thereby reducing the flow through helical passage 136 and into bearing 104. If, on the other hand, the bearing 104 offers high resistance to inflow of lubricant, a relatively small flow of lubricant occurs through the passage 136 and the differential pressure between opposite ends of this passage is relatively small. Ball valve 132 is thereby urged toward its seat 130 by only a small force and most of the fluid pressure in the pipe 122 is available in annular space 142 to force lubricant through passage 136 and to the bearing.

From the foregoing description of Figs. 1 and 2, it will be apparent that the operations of these two embodiments of my invention are essentially the same and that both of these embodiments automatically compensate for differences in the resistances of the bearings themselves. It is usual in centralized lubricating systems to provide screens or other filters or strainers for removing impurities from the lubricant, and such screens are commonly provided either at the lubricant compressor or at the resistance units or in both places. While I have not illustrated my resistance units as being provided with strainers, any conventional or desired means for removing impurities from the lubricant may be used in connection with these resistance units. In this connection, I wish to point out that the design of these units is such that they are not easily clogged or interfered with by the presence of impurities in the lubricant.

My invention is susceptible to numerous variations and modifications in addition to those illustrated and described. My invention is, therefore, not to be construed as limited to the details shown and described, but is to be considered as including all variations and modifications falling within the scope of the appended claims.

I claim:

1. A resistance unit comprising a body having a bore therein, a plug slidable in said bore and having a passage of fixed dimensions offering resistance to the flow of lubricant therethrough, an inlet through which lubricant is supplied to said bore, a valve for restricting flow of lubricant through said inlet, said valve being urged to open position by lubricant pressure at said inlet, and means responsive to the differential pressure across said plug to urge said valve toward closed position.

2. In a resistance unit of the class described, the combination of a body having a cylindrical bore therein, a plug closely fitting said bore and slidable therein and having a helical groove of fixed dimensions cooperating therewith to form a high resistance lubricant passage, said plug being moved in said bore in response to pressure differentials between the opposite ends of said plug, a lubricant inlet for said bore, a ball valve for regulating flow of lubricant through said inlet, said valve being urged toward open position by lubricant pressure at said inlet, and means for shifting the position of said valve to correspond to different positions of said plug in said bore resulting from differences in the differential pressure across said plug.

3. In a resistance unit of the class described, the combination of a body having a cylindrical bore therein and a nipple provided with an outlet communicating with said bore, a plug slidable in said bore and having a passage offering fixed resistance to the flow of lubricant therethrough, said plug being moved in said bore in response to pressure differentials between the opposite ends thereof, a pipe for supplying lubricant pressure to said bore, a valve controlling flow of lubricant from said pipe to said bore and urged toward open position by lubricant pressure in said pipe, a pivoted lever having a part engaging said valve, and means connecting said lever with said plug so that movement of said plug resulting from increases in the differential pressure across said plug creates movement of said lever and of said valve toward closed position.

4. In a resistance unit of the class described, the combination of a body having a bore therein and adapted to be connected to a bearing requiring lubrication, a member slidable in said bore and offering fixed resistance to flow of lubricant therethrough, said member being moved in said bore in response to pressure differentials between the opposite ends thereof, an inlet pipe for supplying said bore with lubricant under pressure, a ball valve for controlling flow of lubricant from said pipe into said bore and urged toward open position by lubricant pressure in said inlet pipe, a lever having one arm engaging said valve, a U-shaped strap carried by said member and engaging a second arm of said lever, and a fulcrum for said lever interposed between said valve and strap the arrangement being such that increases in the differential in pressure across the plug effect movement of said valve toward closed position.

5. A resistance unit of the class described, comprising in combination, a tubular body having a nipple at one end, said body having a relatively large cylindrical bore and a smaller outlet bore extending through said nipple, a plug slidable in said larger bore and having a passage offering fixed resistance to flow of lubricant therethrough, a tapered head in said larger bore, a neck connecting said head and plug, an inlet for said larger bore through which lubricant under pressure may be supplied, and a ball valve for controlling flow through said inlet, said valve being located between said plug and head, said valve being urged to closed position by said head on increase in differential pressure acting across said plug and to open position by lubricant pressure in said inlet.

6. A resistance unit of the class described, comprising a tubular body providing a bore, means forming an outlet at one end of said bore, a closure for the other end of said bore, a resistance plug slidable in said bore and offering fixed resistance to flow of lubricant to said outlet, an inlet for supplying lubricant under pressure to said bore, a head slidable with said plug, a valve member between said plug and head the arrangement being such that the valve is urged by the latter to close said inlet when the pressure differential across said plug increases, said member being urged to open position by lubricant pressure in said inlet.

7. In a resistance unit of the class described, the combination of a body having a bore therein, a resistance plug slidable in said bore, and providing a restricted passage of fixed dimensions for flow of lubricant therepast, an inlet for said bore, means for restricting lubricant flow through said inlet, said means being urged toward nonrestricting position by lubricant pressure at said inlet, and means operatively connecting said plug with said flow restricting means to urge said flow restricting means toward flow restricting position by an increase in the differential in pressure across said plug, whereby said flow restricting means is responsive to the pressure differential between opposite ends of said plug.

8. In a resistance unit of the class described, the combination of a body having a bore therein, a member slidable in said bore and having a passage offering fixed resistance to flow of lubricant therethrough, an inlet passageway at one end of said bore adapted to be connected to a source of lubricant under pressure, outlet means at the other end of said bore adapted to be connected to a bearing requiring lubricant, said member having opposite ends exposed to the pressures existing at opposite ends of said passage, and an unbalanced valve for varying the lubricant pressure in the inlet end of said bore with variations in pressure drop between the ends of said passage, said valve having a part exposed to lubricant pressure in said inlet passageway and being urged thereby toward open position, said valve being connected to said slidable member whereby increases in the differential pressure across said member act to move the valve toward closed position.

ERNEST W. DAVIS.